(12) United States Patent
Nozawa et al.

(10) Patent No.: US 12,045,759 B2
(45) Date of Patent: Jul. 23, 2024

(54) INFORMATION PROCESSING APPARATUS, METHOD, COMMUNICATION TERMINAL, AND NON-TRANSITORY COMPUTER-READABLE STORAGE MEDIUM

(71) Applicant: HONDA MOTOR CO., LTD., Tokyo (JP)

(72) Inventors: Naoko Nozawa, Beijing (CN); Minghao Gu, Beijing (CN); Yuan Qi, Beijing (CN)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 17/485,965

(22) Filed: Sep. 27, 2021

(65) Prior Publication Data
US 2022/0012675 A1 Jan. 13, 2022

Related U.S. Application Data

(63) Continuation of application No. PCT/JP2020/013776, filed on Mar. 26, 2020.

(30) Foreign Application Priority Data

Mar. 29, 2019 (CN) .......................... 201910248971.0

(51) Int. Cl.
*G06Q 10/083* (2024.01)
*G06Q 50/40* (2024.01)
*H04W 4/02* (2018.01)

(52) U.S. Cl.
CPC ........... *G06Q 10/083* (2013.01); *G06Q 50/40* (2024.01); *H04W 4/023* (2013.01)

(58) Field of Classification Search
CPC ...... G06Q 10/083; G06Q 50/30; H04W 4/023
(Continued)

(56) References Cited

U.S. PATENT DOCUMENTS

2003/0137277 A1\* 7/2003 Mori ................... H02J 7/00036
320/132
2006/0034201 A1 2/2006 Umeda et al.
(Continued)

FOREIGN PATENT DOCUMENTS

CN 107563572 A 1/2018
CN 108357600 A 8/2018
(Continued)

OTHER PUBLICATIONS

"The impact of location and type on the performance of low-voltage network connected battery energy storage systems" Published by Elsevier (Year: 2016).\*
(Continued)

*Primary Examiner* — Zeina Elchanti
(74) *Attorney, Agent, or Firm* — WHDA, LLP

(57) ABSTRACT

An information processing apparatus includes a receiving unit configured to receive, from a terminal of a delivery requester of a battery, a delivery request for a battery for which a delivery location of the battery is designated, a selecting unit configured to select at least one storage location of a battery, and a specifying unit configured to specify a deliverer who delivers the battery from a storage location. The specifying unit is configured to transmit a delivery inquiry including information of the delivery location and the storage location to a terminal of a delivery candidate, and specify the delivery candidate as the deliverer. When the selecting unit selects a plurality of storage locations for one delivery, the delivery inquiry includes information of each storage location.

14 Claims, 14 Drawing Sheets

(58) Field of Classification Search
USPC .......................................................... 705/330
See application file for complete search history.

(56) References Cited

U.S. PATENT DOCUMENTS

| | | | | |
|---|---|---|---|---|
| 2016/0086128 | A1* | 3/2016 | Geiger | G06Q 10/063118 705/7.17 |
| 2017/0213161 | A1* | 7/2017 | Moati | G06Q 10/02 |
| 2019/0149952 | A1* | 5/2019 | Parks, Jr. | G06Q 30/0635 705/26.82 |
| 2020/0384879 | A1* | 12/2020 | Ebisu | B60L 53/305 |

FOREIGN PATENT DOCUMENTS

| | | | |
|---|---|---|---|
| CN | 207833558 | U | 9/2018 |
| JP | 9-035192 | A | 2/1997 |
| JP | 2004-298326 | A | 10/2004 |
| JP | 2006-40007 | A | 2/2006 |
| JP | 2010-039961 | A | 2/2010 |
| JP | 2016-207179 | A | 12/2016 |
| JP | 2016-224839 | A | 12/2016 |
| KR | 20020061091 | A | 7/2002 |
| KR | 10-2016-0043526 | A | 4/2016 |
| TW | 201346819 | A | 11/2013 |

OTHER PUBLICATIONS

Office Action dated May 30, 2023, issued in counterpart TW Application No. 109110184, with English Translation. (21 pages).
Office Action dated Mar. 24, 2022, issued in counterpart IN application No. 202147048555. (7 pages).
International Search Report dated Jul. 14, 2020, issued in counterpart application No. PCT/JP2020/013776, w/English translation (2 pages).
Written Opinion dated Jul. 14, 2020, issued in counterpart application No. PCT/JP2020/013776 (4 pages).
PCT/IPEA/416 dated May 11, 2021, issued in counterpart application No. PCT/JP2020/013776 (18 pages).
Office Action dated Sep. 28, 2023, issued in counterpart CN application No. 201910248971.0, with English translation. (34 pages).

* cited by examiner

| ID | CONTACT ADDRESS | DELIVERY REQUEST | DELIVERY CONDITION ||
| | | | DELIVERY LOCATION | TIME |
|---|---|---|---|---|
| A001 | ... | YES | ... | ... |
| A002 | ... | NO | ... | ... |
| ... | ... | ... | ... | ... |

(221)

| ID | CONTACT ADDRESS | CURRENT POSITION | DEALABLE CONDITION || TRANSPORTATION METHOD |
| | | | SCHEDULE | AREA | |
|---|---|---|---|---|---|
| B001 | ###@··· | ... | ... | ... | MOTORCYCLE |
| B002 | ... | ... | ... | ... | WALKING |
| ... | ... | ... | ... | ... | ... |

(222)

| ID | TITLE | LOCATION | STOCK QUANTITY |
|---|---|---|---|
| G001 | ... | YES | 10 |
| G002 | ... | NO | 1 |
| ... | ... | ... | ... |

(223)

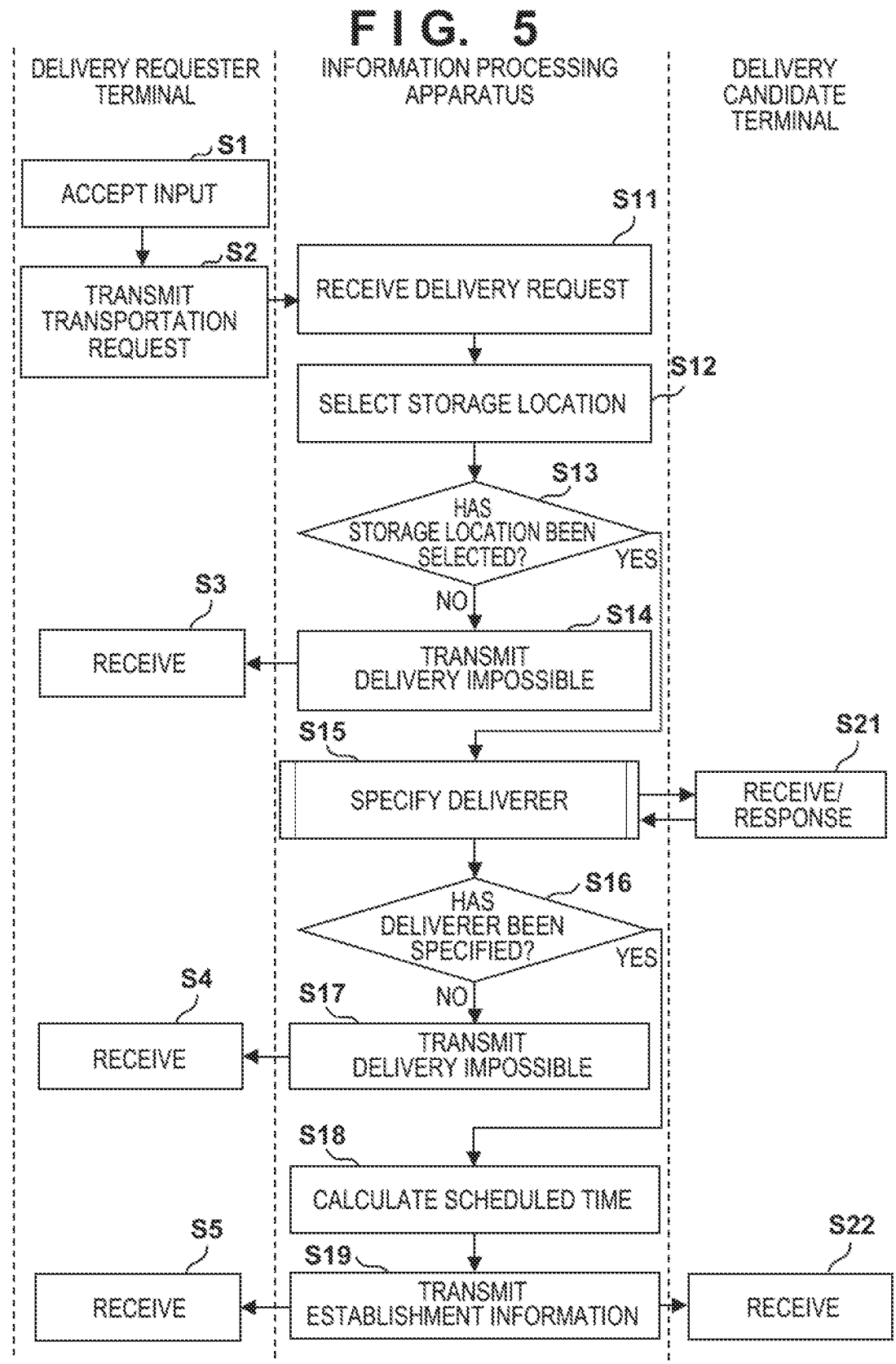

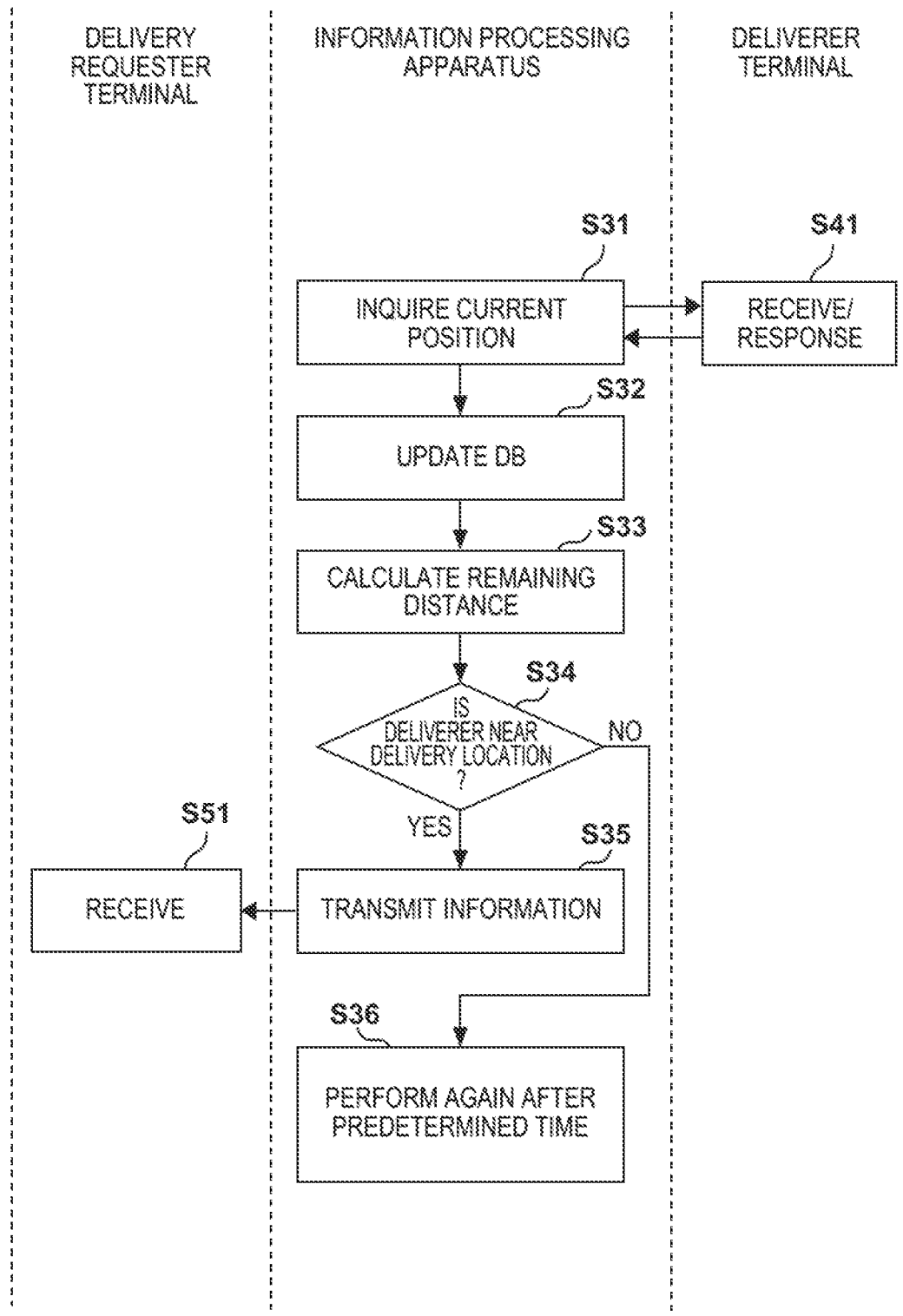

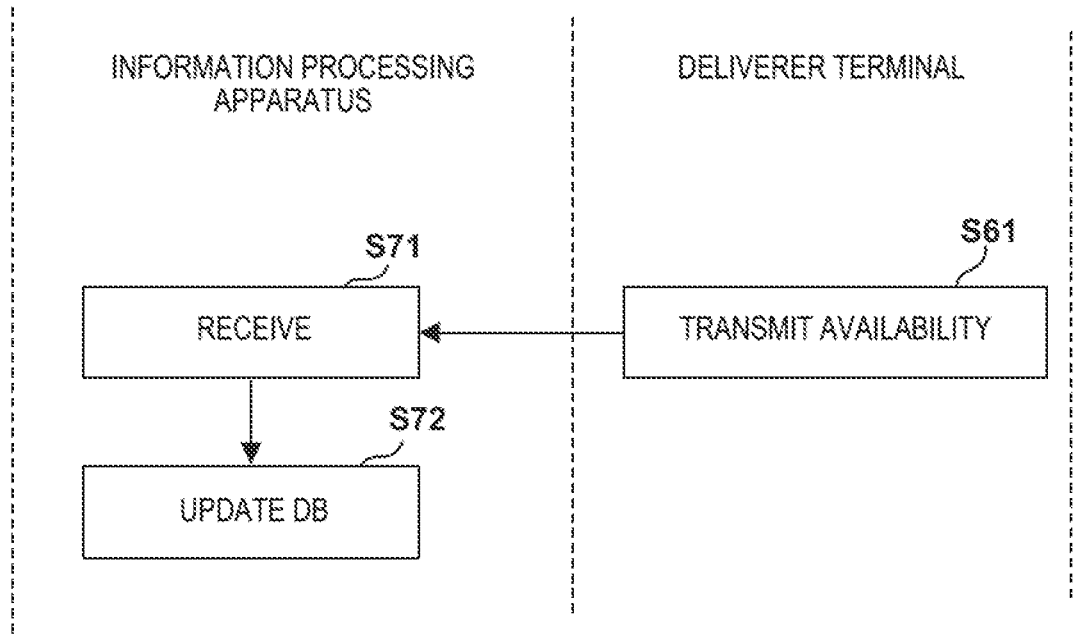

INFORMATION PROCESSING APPARATUS, METHOD, COMMUNICATION TERMINAL, AND NON-TRANSITORY COMPUTER-READABLE STORAGE MEDIUM

CROSS-REFERENCE TO RELATED APPLICATION(S)

This application is a Continuation of International Patent Application No. PCT/JP2020/013776, filed Mar. 26, 2020, which claims the benefit of Chinese Patent Application No. 201910248971.0, filed Mar. 29, 2019, both of which are hereby incorporated by reference herein in their entirety.

BACKGROUND OF THE INVENTION

Field of the Invention

The present invention relates to an information processing apparatus, a method, a communication terminal, and a storage medium related to delivery of a battery.

Description of the Related Art

An electric device driven by a battery cannot be used when the remaining amount of the battery runs out or the battery deteriorates. As a service related to deterioration of a battery, Japanese Patent Laid-Open No. 2016-207179 discloses a technique related to a battery lending service of an electric-assist bicycle.

When the remaining amount of the battery of an electric device used at the place where the user goes, such as an electric motorcycle, runs out, the user cannot use it at the place where the user goes. The user can also charge the battery at the nearest charging facility, but if there is no charging facility nearby, it is difficult to charge the battery. If a charged battery is delivered to the place where the user goes, the convenience of the user can be improved.

SUMMARY OF THE INVENTION

An object of the present invention is to provide a technique for assisting a service of delivering a battery to the place where the user goes.

According to an aspect of the present invention, there is provided an information processing apparatus comprising:
a receiving unit configured to receive, from a terminal of a delivery requester of a battery, a delivery request for a battery for which a delivery location of the battery is designated;
a selecting unit configured to select, for each delivery, at least one storage location of a battery delivered to the delivery requester based on the delivery location; and
a specifying unit configured to specify a deliverer who delivers the battery from a storage location where a delivery battery is stored to the delivery location,
wherein the specifying unit is configured to transmit a delivery inquiry including information of the delivery location and the storage location to a terminal of a delivery candidate, and specifies the delivery candidate as the deliverer on condition that a response indicating acceptance of delivery with respect to the delivery inquiry is received from the terminal of the delivery candidate, and
when the selecting unit selects a plurality of storage locations for one delivery, the delivery inquiry includes information of each storage location.

Further features of the present invention will become apparent from the following description of exemplary embodiments (with reference to the attached drawings).

BRIEF DESCRIPTION OF THE DRAWINGS

FIG. 5 is a flowchart illustrating an example of processing executed by the assistance system of FIG. 1.
FIG. 11 is a flowchart illustrating an example of processing executed by the assistance system of FIG. 1.
FIG. 12A is a flowchart illustrating an example of processing executed by the assistance system of FIG. 1.
FIG. 12B is a diagram illustrating an example of information stored in a database.

DESCRIPTION OF THE EMBODIMENTS

Figure 1:
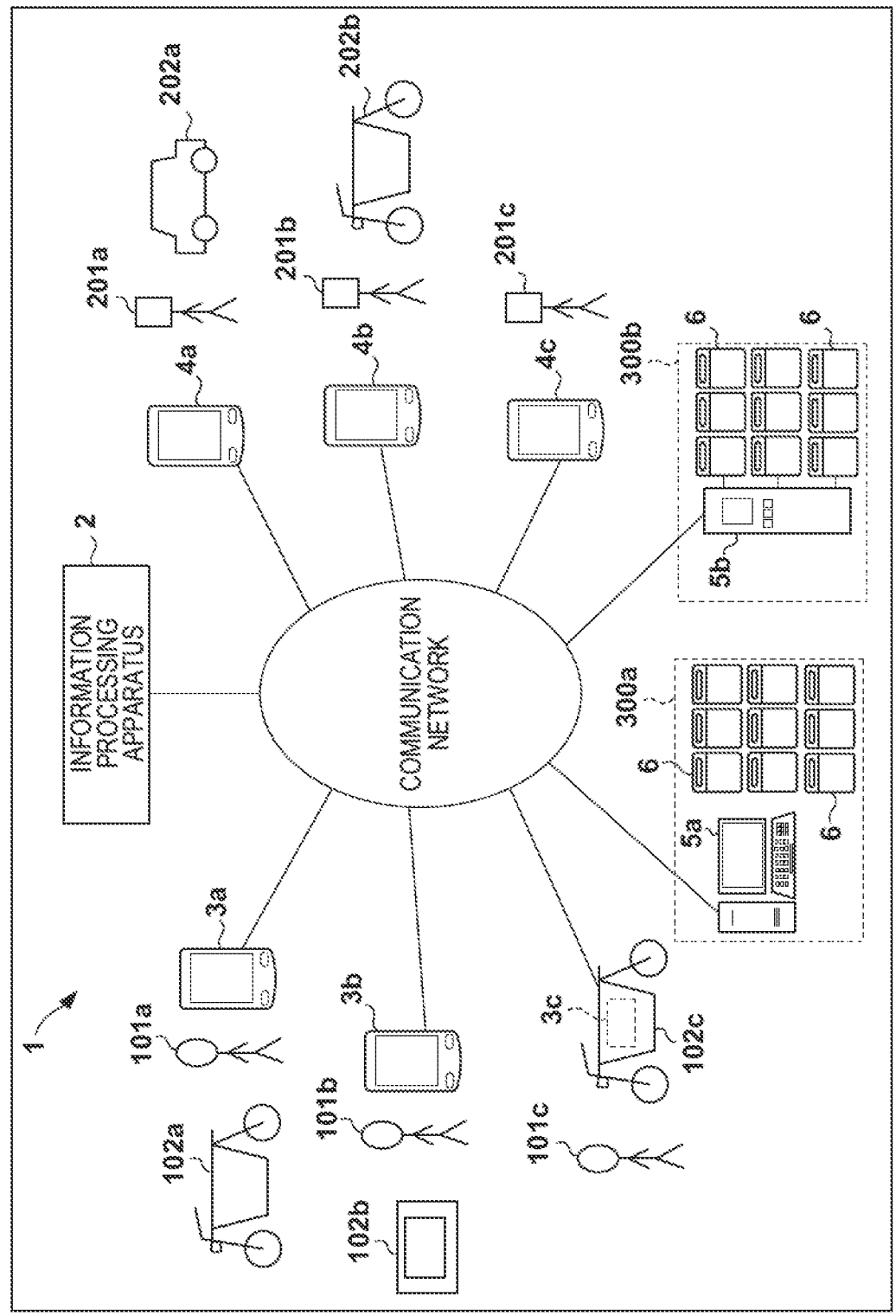
FIG. 1 is a schematic diagram of an assistance system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

<Outline of System>

FIG. 1 is a schematic diagram of an assistance system 1. The assistance system 1 is a system that manages a delivery service of a portable battery by an information processing apparatus 2. The information processing apparatus 2 is a server that is communicably connected to communication terminals 3a to 3c, communication terminals 4a to 4c, and communication terminals 5a and 5b via a communication network such as the Internet and operates a delivery service.

The illustrated communication terminals 3a to 3c exemplify communication terminals used by users 101a to 101c of electrical appliances who can request delivery of charged batteries, and the number of users is not limited to three. In the description described below, in a case where the users 101a to 101c are collectively referred to or not distinguished from each other, they are referred to as the users 101, and in a case where persons who are battery delivery requesters among the users are indicated, they are also referred to as delivery requesters. In addition, in a case where the communication terminals 3a to 3c are collectively referred to or not distinguished from each other, they are referred to as the communication terminals 3.

In the example of FIG. 1, a user 101a is a user of an electric vehicle (here, an electric motorcycle) 102a that can be driven by a battery to be delivered. A communication terminal 3a of the user 101a is a mobile terminal such as a smartphone. A user 101b is a user of a home appliance 102b that can be driven by a battery to be delivered. The home appliance 102b is, for example, an electric cooking appliance that can be used at a camping site or the like, a discharge appliance for using a battery as an external power supply, a charger for charging a battery, or the like. A communication terminal 3b of the user 101b is a mobile terminal such as a smartphone. A user 101c is a user of an electric vehicle (here, an electric motorcycle) 102c that can be driven by a battery to be delivered. A communication terminal 3c of the user 101c is an in-vehicle communication terminal mounted on the electric vehicle 102c.

The illustrated communication terminals 4a to 4c exemplify communication terminals used by delivery candidates 201a to 201c that can be deliverers who deliver batteries, and the number of delivery candidates is not limited to three. In the description described below, in a case where the delivery candidates 201a to 201c are collectively referred to or not distinguished from each other, they are referred to as the delivery candidates 201. In addition, in a case where the communication terminals 4a to 4c are collectively referred to or not distinguished from each other, they are referred to as the communication terminals 4. The delivery candidate is assumed to be an employee belonging to a company that performs a delivery business, but if the eligibility for being a delivery candidate is loosened and more persons including ordinary persons who do not belong to such a company can be delivery candidates, the spread of the delivery service of the present embodiment can be promoted.

In the example of FIG. 1, a delivery candidate 201a is a person who delivers an article by a four-wheeled vehicle 202a. A communication terminal 4a of the delivery candidate 201a is a mobile terminal such as a smartphone. A delivery candidate 201b is a person who delivers an article by a motorcycle 202b. A communication terminal 4b of the delivery candidate 201b is a mobile terminal such as a smartphone. The delivery candidate 201b is a person who delivers an article by a motorcycle or a bicycle (two-wheeled vehicle or three-wheeled vehicle) 202b. A communication terminal 4b of the delivery candidate 201b is a mobile terminal such as a smartphone. The power source of the four-wheeled vehicle 202a and the motorcycle 202b may be a battery or gasoline. The delivery candidate 201c is a person who delivers an article on foot. A communication terminal 4c of the delivery candidate 201c is a mobile terminal such as a smartphone.

The illustrated communication terminals 5a and 5b exemplify communication terminals installed in storage locations 300a and 300b where batteries are stored, and the number of storage locations is not limited to two. In the description described below, in a case where the storage locations 300a and 300b are collectively referred to or not distinguished from each other, they are referred to as the storage locations 300. In addition, in a case where the communication terminals 5a and 5b are collectively referred to or not distinguished from each other, they are referred to as the communication terminals 5.

The storage location 300 is a charging facility in which a battery 6 to be delivered, that is, the delivery battery 6 is stored, and is, for example, a battery station, a store of the electric vehicle 102a, or a maintenance factory of the electric vehicle 102a. A communication terminal 5a is a personal computer used by an administrator of the storage location 300a, and a communication terminal 5b is a control computer of a charging apparatus installed in the storage location 300b.

<Overview of Delivery Service>

Figure 2A:
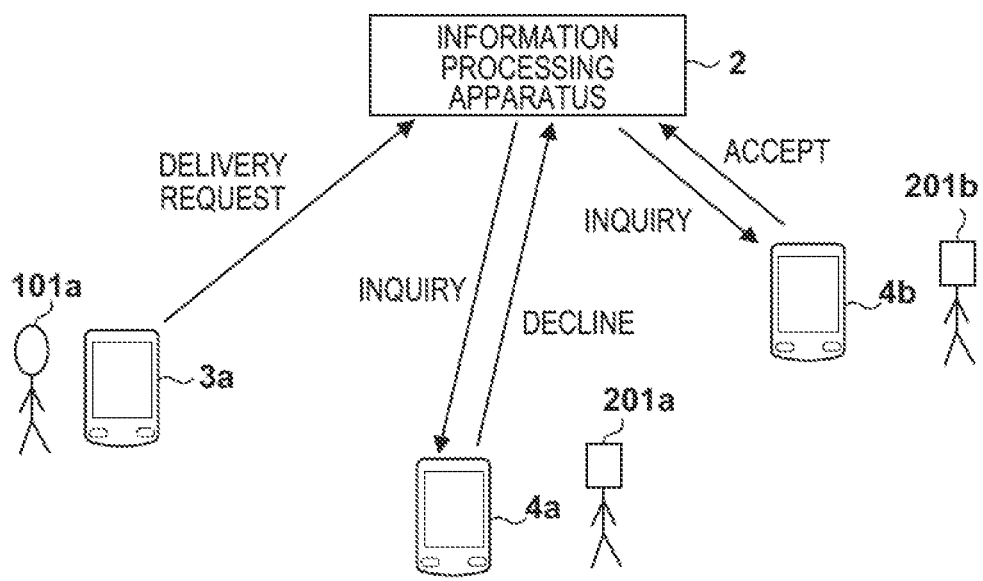
FIG. 2A is an explanatory diagram illustrating an operation example of a delivery service.
Figure 2B:
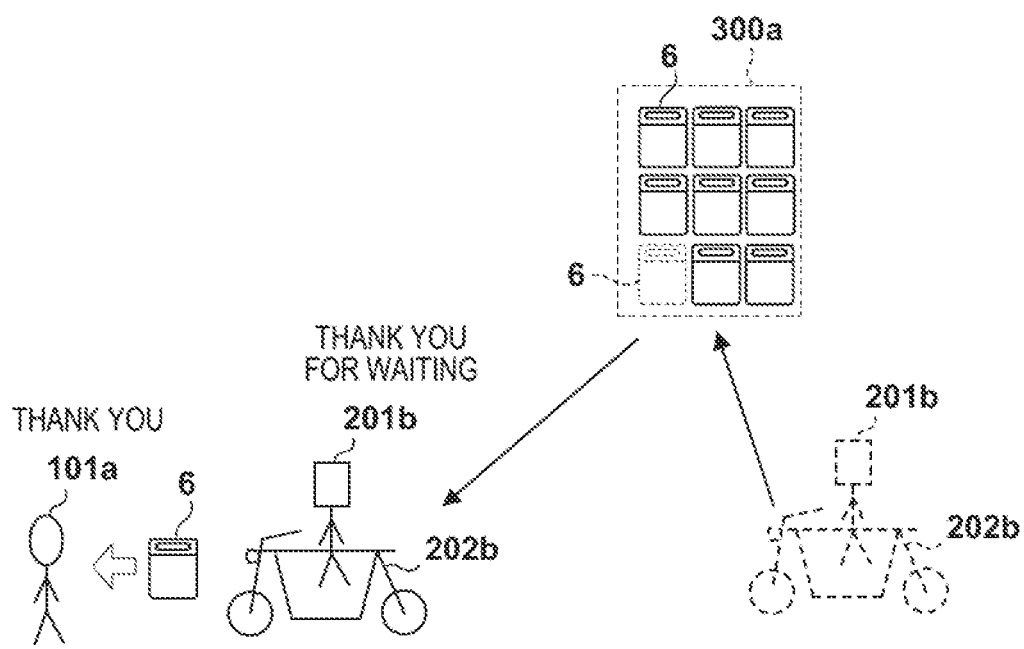
FIG. 2B is an explanatory diagram illustrating an operation example of a delivery service.

FIGS. 2A and 2B are explanatory diagrams illustrating an operation example of a battery delivery service in the present embodiment. The delivery service of the present embodiment is, for example, one form of a battery sharing service, and is a delivery service accompanying a service for lending the battery 6 to a pre-registered user 101. In the present embodiment, it is assumed that batteries that have common specs or are compatible are lent, but batteries having different specs may be lent.

In this delivery service, the delivery requester 101 who requests delivery of the charged battery 6 transmits a delivery request from its own communication terminal 3 to the information processing apparatus 2. In the example of FIG. 2A, the user 101a transmits a delivery request from its own communication terminal 3a. The information processing apparatus 2 transmits a delivery inquiry to the communication terminal 4 of the delivery candidate 201. In the example of FIG. 2A, a delivery inquiry is transmitted to each of the communication terminals 4a and 4b of the delivery candidates 201a and 201b. The delivery candidate replies to the delivery inquiry with the communication terminal. In the example of FIG. 2A, the delivery candidate 201b has accepted and the delivery candidate 201a has declined. The delivery candidate 201b is specified as a deliverer.

As illustrated in FIG. 2B, the deliverer 201b goes to the storage location 300a to receive the charged battery 6, and delivers the battery 6 to the delivery requester 101. Thus, one service ends. The delivery requester 101 can quickly receive the delivery of the battery 6.

<Configuration Examples of Information Processing Apparatus and Communication Terminal>

Figure 3A:
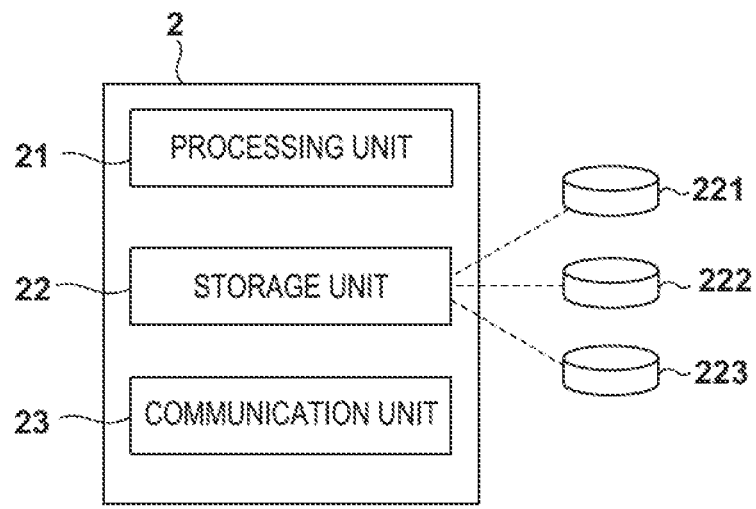
FIG. 3A is a block diagram of an information processing apparatus.

FIG. 3A is a block diagram of the information processing apparatus 2. The information processing apparatus 2 includes a processing unit 21, a storage unit 22, and a communication unit 23. The processing unit 21 is a processor represented by a CPU, and executes a program stored in the storage unit 22. The storage unit 22 is a storage device such as a RAM, a ROM, or a hard disk. The communication unit 23 includes a wired or wireless communication interface capable of communicating with the communication terminals 3, 4, and 5 via a communication network.

The storage unit 22 stores various data in addition to the program executed by the processing unit 21. In the example of FIG. 3A, databases (DB) 221 to 223 are illustrated as data stored in the storage unit 22. The DB 221 is a DB in which information of the user 101 is registered, and the DB 221 may be referred to as a user DB 221. The DB 222 is a DB in which information of the delivery candidate 201 is registered, and the DB 222 may be referred to as a deliverer DB 222. The DB 223 is a DB in which information of the storage location 300 is registered, and the DB 223 may be referred to as a storage location DB. Note that the DB 221, the DB 222, and the DB 223 may be separate databases, or may be collectively one database. In the present embodiment, for convenience, the databases are described separately, but it is not limited that each database exists as a separate database.

Note that, in the present embodiment, an example is assumed in which both the delivery requester and the delivery candidate are registered as members in advance. However, an operation mode in which a person who has not been registered as a member can also participate in the delivery service may be adopted.

Figures 4A, 4B, 4C, 4D:
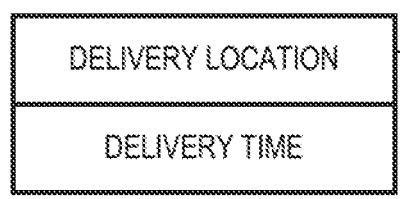
FIG. 4A is a diagram illustrating an example of information stored in a database.
FIG. 4B is a diagram illustrating an example of information stored in a database.
FIG. 4C is a diagram illustrating an example of information stored in a database.
FIG. 4D is a diagram illustrating an example of information included in a delivery request.

FIG. 4A illustrates an example of information accumulated in the user DB 221. A record for each user (each member) is accumulated in the user DB 221. "ID" is a code for identifying each user 101. "Contact address" is information of the contact address of the user 101, and is typically an e-mail address or a telephone number of the communication terminal 3. "Delivery request" is status information indicating whether the user 101 is currently making a delivery request, "Yes" indicates that the delivery request is being made, and "No" indicates that the delivery request is not being made. The state that the delivery request being made may be from the transmission of the delivery request to the receipt of the battery.

In a case where the user 101 is making a delivery request, "delivery condition" is information indicating the condition. In the illustrated example, "delivery location" and "time" are illustrated. "Delivery location" is information of a position where the battery is received. "Time" is information regarding time when the battery is received, and may be specific time information (for example, 2 PM) or information of a time zone (1 PM to 2 PM).

FIG. 4B illustrates an example of information accumulated in the deliverer DB 222. A record for each delivery candidate (each member) is accumulated in the deliverer DB 222. "ID" is a code for identifying each delivery candidate 201. "Contact address" is information of the contact address of the delivery candidate 201, and is typically an e-mail address or a telephone number of the communication terminal 4. "Current position" is information indicating the current position of the delivery candidate 201, and current position information transmitted from the communication terminal 4 is used.

"Dealable condition" is information indicating a condition that the delivery candidate 201 can deal with for the delivery request. This information is mainly information used to search for a delivery candidate to be inquired when there is a delivery request. In the illustrated example, "schedule" and "area" are illustrated. "Schedule" is information regarding a date and time when the delivery candidate 202 can perform delivery. Examples of the type include only weekdays, only holidays, only afternoons, only mornings, no limitation, and the like. "Area" is information regarding a range on a map where the delivery candidate 202 can perform delivery. Examples of the type include, for example, only ○○ city, the entire ○○ region, no limitation, and the like.

"Transportation method" is information regarding a transportation method for the battery 6 by the delivery candidate 201. This information is mainly information used to estimate the time when the battery 6 is delivered to the delivery requester when there is a delivery request. Examples of the type include "motorcycle", "walking", "automobile", and the like.

FIG. 4C illustrates an example of information accumulated in the storage location DB 223. A record for each storage location of the battery 6 is accumulated in the storage location DB 223. "ID" is a code for identifying each storage location 300. "Location" is information indicating a geographical position of the storage location 300. "Stock quantity" is the number of charged batteries 6 stored in the storage location 300. Through periodic communication between the information processing apparatus 2 and the communication terminal 5, the information processing apparatus 2 acquires information of the "stock quantity" and updates the storage location DB 223.

Figure 3B:
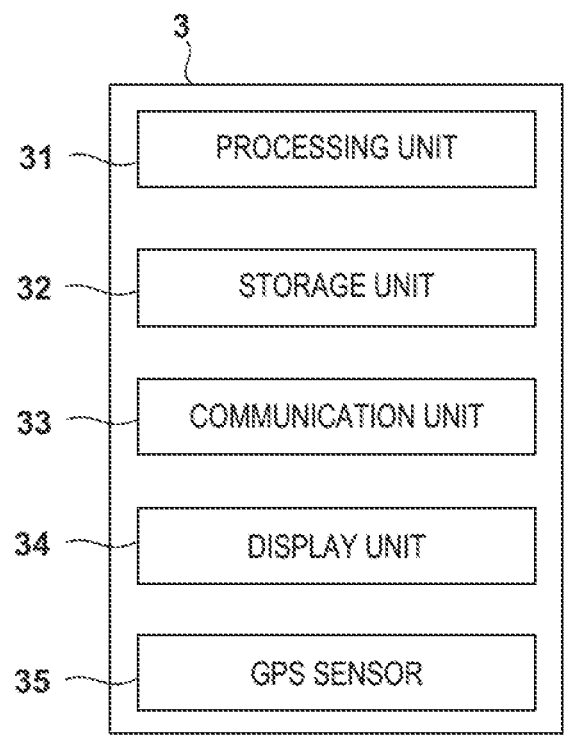
FIG. 3B is a block diagram of a communication terminal.

Referring back to FIG. 3, FIG. 3B is a block diagram of the communication terminal 3. The communication terminal 3 includes a processing unit 31, a storage unit 32, a communication unit 33, a display unit 34, and a global positioning system (GPS) sensor 35. The processing unit 31 is a processor represented by a CPU, and executes a program stored in the storage unit 32. The storage unit 32 is a storage device such as a RAM or a ROM. The program stored in the storage unit 32 also includes an application program for a delivery requester to use the delivery service of the present embodiment. The application program may be downloaded from a server such as the information processing apparatus 2 or may be distributed in a storage medium such as a CD-ROM.

The communication unit 33 is a wireless communication apparatus capable of communicating with the information processing apparatus 2 via a communication network. The display unit 34 is an electronic image display apparatus having an input function, and is, for example, a touch panel display. The GPS sensor 35 is a sensor that detects the current position of the communication terminal 3.

Figure 3C:
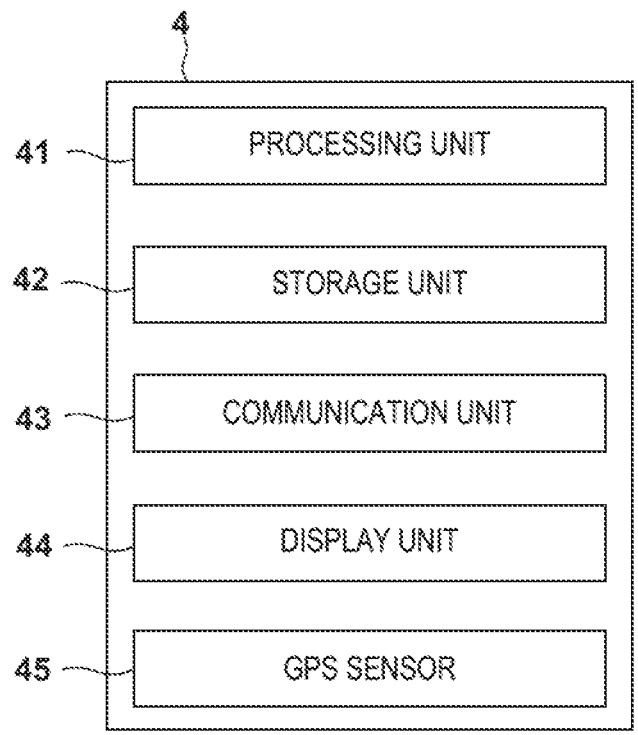
FIG. 3C is a block diagram of a communication terminal.

FIG. 3C is a block diagram of the communication terminal 4. The communication terminal 4 includes a processing unit 41, a storage unit 42, a communication unit 43, a display unit 44, and a global positioning system (GPS) sensor 45. The processing unit 41 is a processor represented by a CPU, and executes a program stored in the storage unit 42. The storage unit 42 is a storage device such as a RAM or a ROM. The program stored in the storage unit 42 also includes an application program for a deliverer to use the delivery service of the present embodiment. The application program may be downloaded from a server such as the information processing apparatus 2 or may be distributed in a storage medium such as a CD-ROM.

The communication unit 43 is a wireless communication apparatus capable of communicating with the information processing apparatus 2 via a communication network. The display unit 44 is an electronic image display apparatus, and is, for example, a touch panel display. The GPS sensor 45 is a sensor that detects the current position of the communication terminal 4.

Processing Example

Figure 7A:
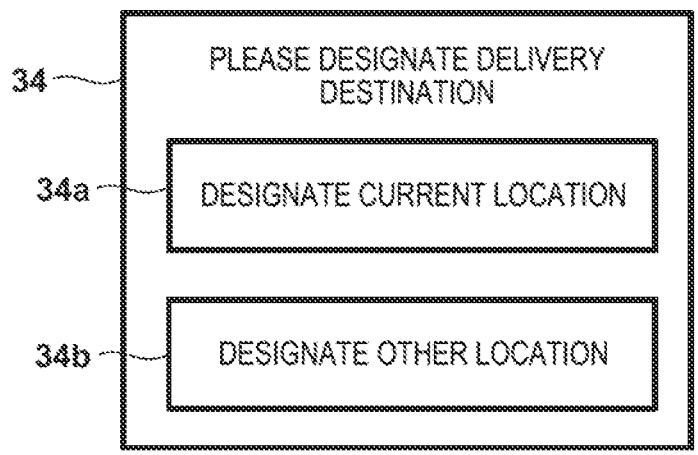
FIG. 7A illustrates a display example of a communication terminal of a delivery requester.
Figure 7B:
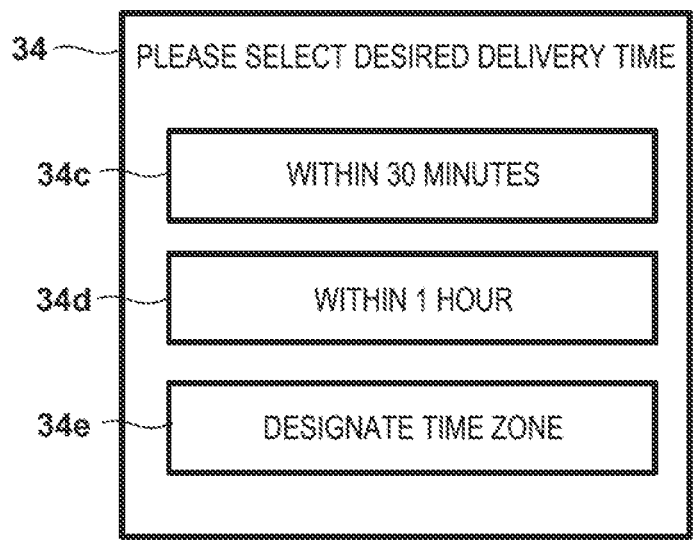
FIG. 7B illustrates a display example of a communication terminal of a delivery requester.
Figure 7C:
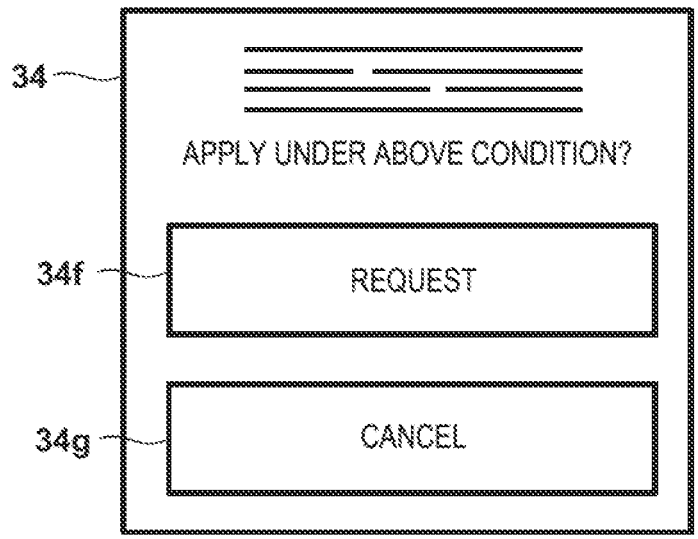
FIG. 7C illustrates a display example of a communication terminal of a delivery requester.

A processing example of the system in a case where the delivery requester 101 makes a delivery request of the battery 6 will be described with reference to FIG. 5. The delivery requester 101 activates an application program for using the delivery service in the communication terminal 3, inputs a delivery condition and the like, and the communication terminal 3 accepts the delivery condition and the like (S1). FIGS. 7A to 7C illustrate display examples (user interface examples) of the display unit 34 at the time of input acceptance.

FIG. 7A illustrates an example of a display screen for designating a delivery location where the delivery requester 101 receives the battery 6. When a button 34a is selected, the processing unit 31 acquires a detection result of the GPS sensor 35 and accepts the position (that is, the current position of the delivery requester 101) as the delivery location. The delivery requester 101 can designate the delivery location through a simple operation. When a button 34b is selected, another window is displayed (not illustrated), and the delivery requester 101 can designate an arbitrary position as the delivery location. The arbitrary position can be designated by, for example, an address, coordinates, the position of a pointer designated on a map, and the like.

FIG. 7B illustrates an example of a display screen for designating delivery time when the delivery requester 101 receives the battery 6. When a button 34c is selected, delivery within 30 minutes from establishment of the delivery request is designated. When a button 34d is selected, delivery within 1 hour from establishment of the delivery request is designated. When a button 34e is selected, another window is displayed (not illustrated), and the delivery requester 101 can designate the delivery time by time zone or time.

FIG. 7C illustrates an example of a display screen on which the delivery requester 101 confirms a delivery request. When a button 34g is selected, the input contents so far are canceled. When a button 34f is selected, in S2 of FIG. 5, the communication terminal 3 transmits a delivery request to the information processing apparatus 2 under the delivery conditions designated in FIGS. 7A and 7B. FIG. 4D illustrates an example of information included in a delivery request RQ, and the delivery location and the delivery time are designated.

Figure 8A:
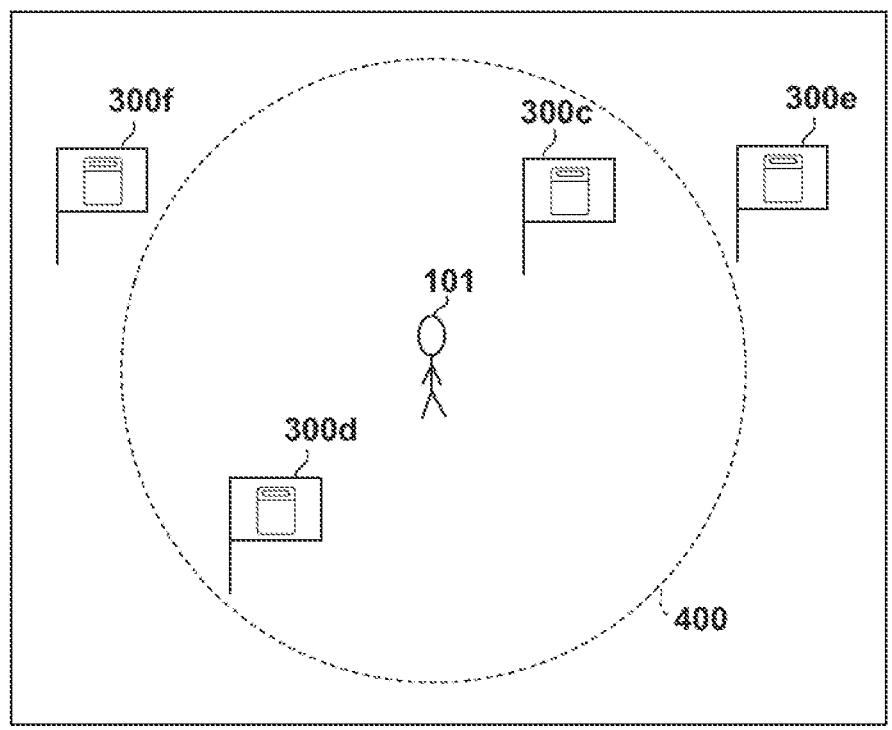
FIG. 8A is an explanatory diagram illustrating a selection example of a storage location.

Referring to FIG. 5, the information processing apparatus 2 receives the delivery request RQ from the communication terminal 3 in S11. In S12, the information processing apparatus 2 selects one or a plurality of storage locations 300 from the storage location DB 223 on the basis of the delivery location designated in the delivery request RQ. For example, a storage location 300 that is within a certain distance from the delivery location designated in the delivery request RQ is selected with reference to "location" (FIG. 4C). FIG. 8A is an example thereof, and it is assumed that the current position of the delivery requester 101 is the delivery location. The storage locations 300c and 300d included in a region 400, which is a range of a certain distance from the delivery requester 101, are selected, and the storage locations 300e and 300f outside the region 400 are not selected. Note that information on all the storage locations may be transmitted to the terminal 4 of the delivery candidate 201 as a delivery inquiry without selecting the storage location 300.

Referring back to FIG. 5, in S13, the information processing apparatus 2 determines whether or not at least one storage location 300 has been selected in the processing of S12. When the at least one storage location 300 has been selected, the process proceeds to S15, and when the at least one storage location 300 has not been selected, the process proceeds to S14. In S14, the information processing apparatus 2 transmits a notification indicating that the delivery request has not been accepted to the communication terminal 3 that has transmitted the delivery request RQ. The communication terminal 3 receives this (S3), and the delivery requester 101 can recognize that.

Figure 6:
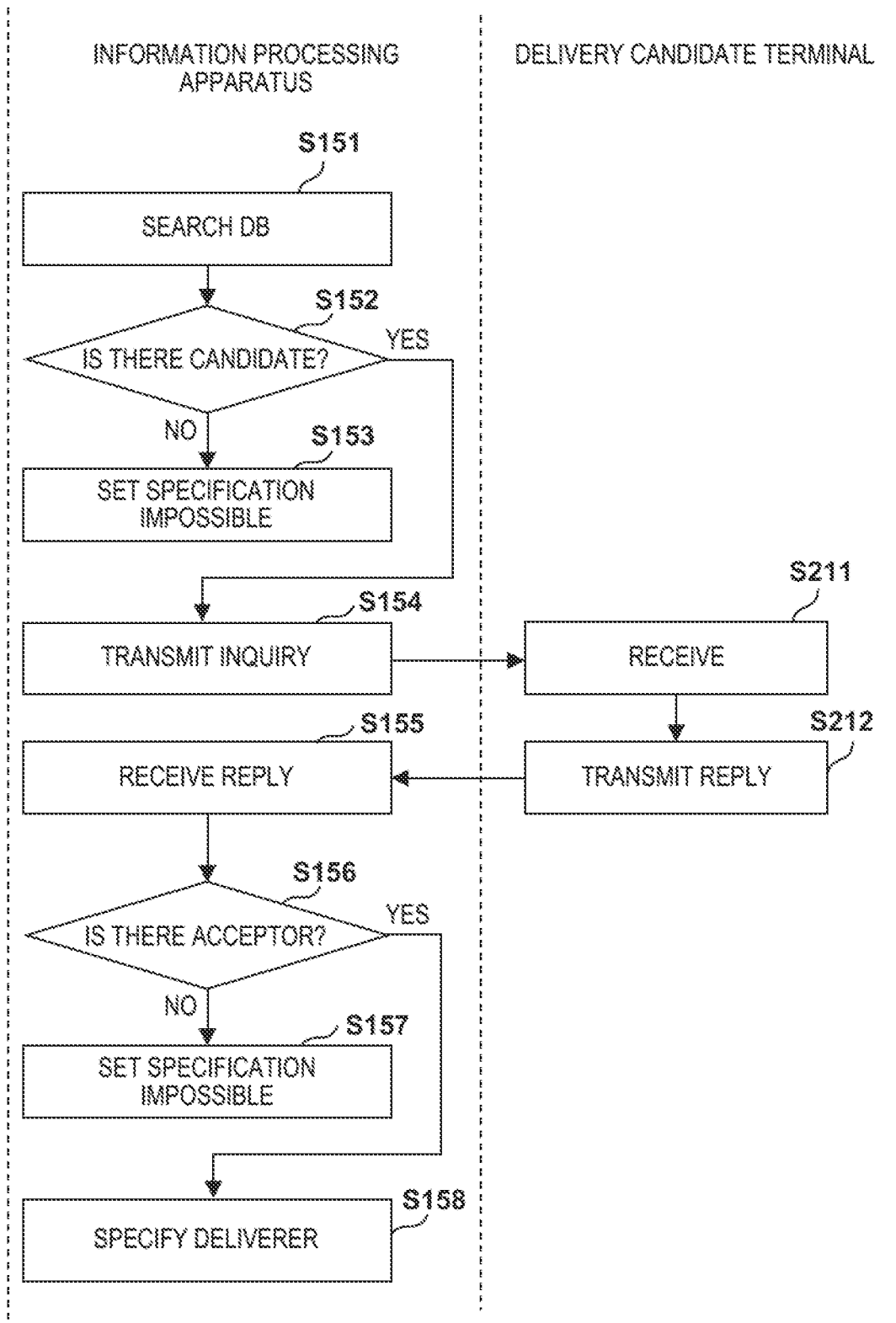
FIG. 6 is a flowchart illustrating an example of processing of specifying a deliverer.

In S14, the information processing apparatus 2 specifies the deliverer 201 who delivers the battery 6 from the storage location 300 selected in S12 to the delivery location. Here, the information processing apparatus 2 transmits an inquiry to the delivery candidate 201, and specifies the deliverer 201 according to a response (S21) from the communication terminal 4 that has received the inquiry. FIG. 6 is a flowchart illustrating an example of processing of S15 and S21.

In S151, the information processing apparatus 2 searches the deliverer DB 222, and selects one or a plurality of delivery candidates 200 to whom an inquiry is transmitted.

Figure 8B:
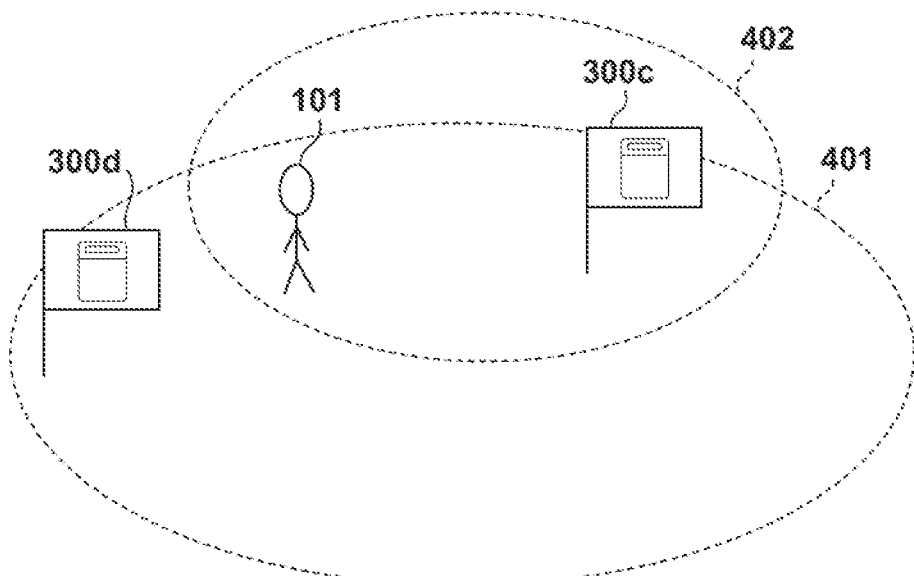
FIG. 8B is an explanatory diagram illustrating a selection example of a delivery candidate.

The delivery candidate 200 can be selected based on the delivery location, the storage location 300 selected in S12, and the "area" information (FIG. 4B) of the delivery candidate 200. FIG. 8B is an explanatory diagram illustrating an example thereof. In the illustrated example, the storage locations 300c and 300d are selected. An area 401, which is an example of the "area" information, includes all the storage locations 300c and 300d and the delivery location (in this example, the current position of the delivery requester 101). Therefore, the deliverer whose area 401 is set as the "area" information in the deliverer DB 222 is selected as a delivery candidate. An area 402, which is an example of the "area" information, includes the storage location 300c and the delivery location (in this example, the current position of the delivery requester 101). The area 402 does not include the storage location 300d, but a delivery candidate whose area 402 is set as "area" information in the deliverer DB 222 can also be selected. That is, when a plurality of storage locations 300 is selected, a delivery candidate whose area includes one selected storage location may be selected.

Figure 9A:
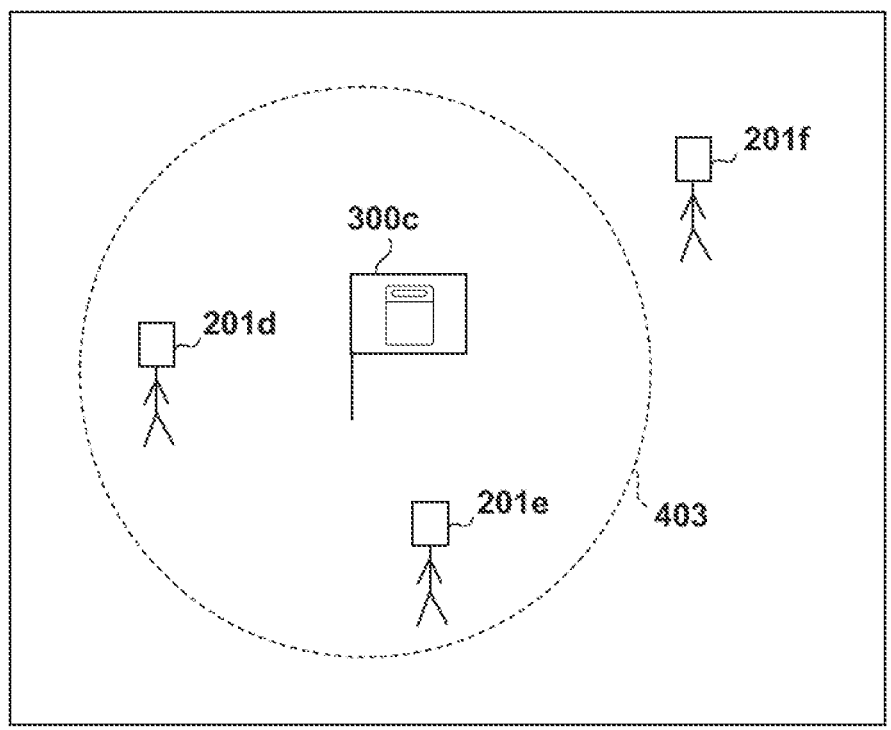
FIG. 9A is an explanatory diagram illustrating another selection example of a delivery candidate.

In a case where the "area" information is not used, or as another selection method of performing further narrowing in combination with the "area" information, for example, the delivery candidate 200 to be inquired may be selected on the basis of the position of the storage location 300 selected in S12 and the current position of the delivery candidate 200. FIG. 9A is an explanatory diagram illustrating an example thereof. In the illustrated example, the delivery candidates 201d and 201e positioned in a region 403, which is a range of a certain distance from the storage location 300c selected in S12, are selected, and the delivery candidate 201f outside the region 403 is not selected.

Figure 9B:
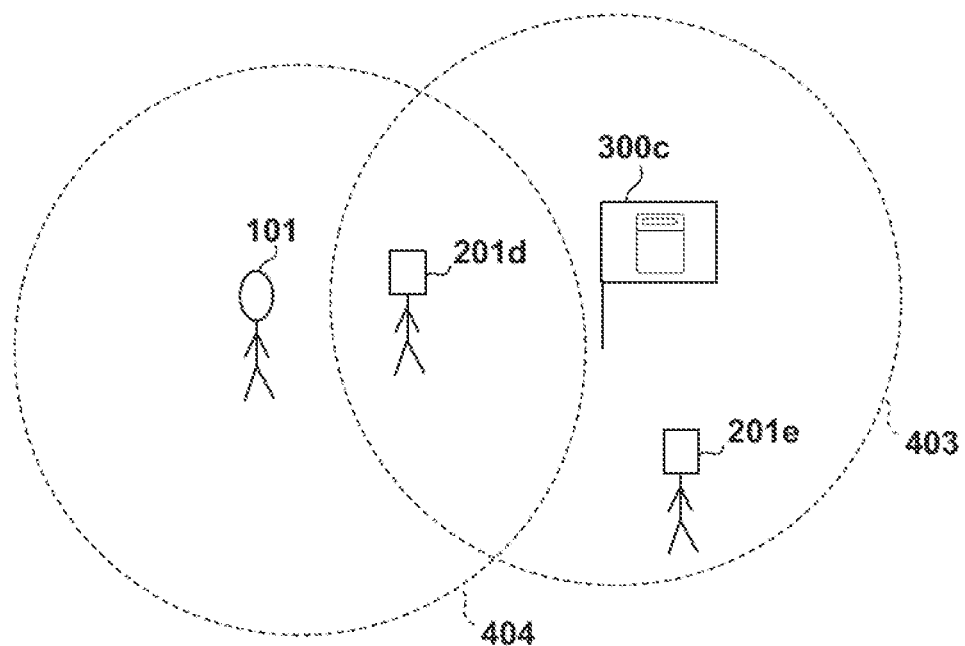
FIG. 9B is an explanatory diagram illustrating another selection example of a delivery candidate.

In this case, the delivery location may be further considered. FIG. 9B is an explanatory diagram illustrating an example thereof. In the illustrated example, the delivery candidate 201d positioned in a region 404, which is a range of a certain distance from the delivery location (in this example, current position of the delivery requester 101), is selected, and the delivery candidate 201e outside the region 404 is not selected.

As still another selection method in a case where the "area" information is not used, for example, all the delivery candidates registered in the deliverer DB 222 may be selected.

Referring back to FIG. 6, in S152, the information processing apparatus 2 determines whether or not at least one delivery candidate 201 has been selected. When the at least one delivery candidate 201 has been selected, the process proceeds to S154, and when the at least one delivery candidate 201 has not been selected, the process proceeds to S153. In S153, it is set that the deliverer 201 could not be specified.

Figure 10A:
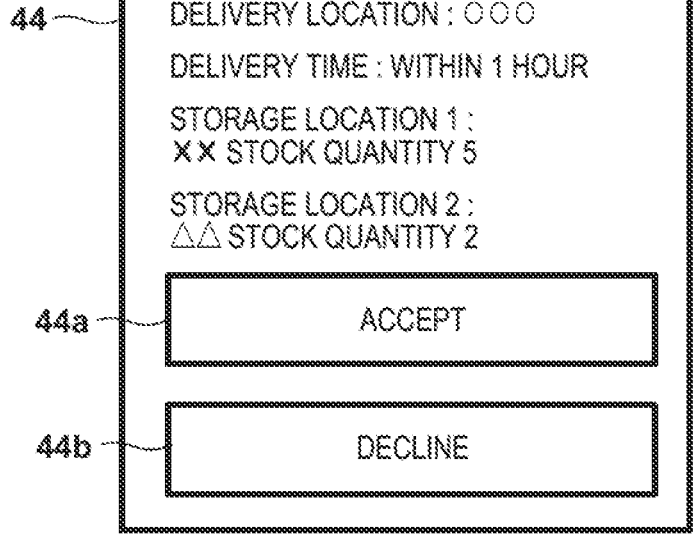
FIG. 10A illustrates a display example of a communication terminal of a deliverer.

In S154, the information processing apparatus 2 transmits a delivery inquiry to the communication terminal 4 of the delivery candidate 201 selected in S151. The communication terminal 4 receives the delivery inquiry (S211). The content of the delivery inquiry is displayed on the communication terminal 4. FIG. 10A illustrates a display example of the display unit 44. In the illustrated example, the delivery condition and the information of the storage location 300 of the battery 6 are displayed on the display unit 44. The delivery condition includes the delivery location and the delivery time designated in the delivery request RQ. In addition, two storage locations 300 are illustrated in the illustrated example, and the stock quantity of the charged batteries 6 in each storage location 300 is also illustrated. Note that the stock information may be indicated by a symbol, a mark, character information, or the like that enable confirmation of the presence or absence of the stock, instead of the display of the number.

The delivery candidate 201 can determine whether or not to undertake delivery of the battery 6 based on the information displayed on the display unit 44. By indicating the stock quantity, for example, it is possible to determine whether there is a storage location where a large number of batteries 6 are stored and the batteries 6 can be unfailingly picked up. When a button 44a is selected, a reply indicating that the delivery is accepted is transmitted from the communication terminal 4 to the information processing apparatus 2 in S212 of FIG. 6. When a button 44b is selected, a reply indicating the declination is transmitted.

In S155, the information processing apparatus 2 receives the reply from the communication terminal 4. In S156, it is determined whether there is at least one acceptor. When there is an acceptor, the process proceeds to S158, and when there is no acceptor, the process proceeds to S157. In S157, it is set that the deliverer 201 could not be specified. In S158, the information processing apparatus 2 specifies the deliverer 201. If there is only one acceptor, the acceptor is specified as the deliverer 201. In a case where there is a plurality of acceptors, one of the acceptors is specified as the deliverer 201. The specifying may be by lottery, may be based on the current position or past records of the acceptor, or may be performed with priority given to the acceptor who has given the reply the earliest. Note that the delivery candidate 201 may be allowed to select a storage location for picking up the battery, and in a case where the delivery candidate 201 is specified as the deliverer 201, the battery of the selected storage location may be allowed to be laid away, that is, reserved.

Referring back to FIG. 5, in S16, the information processing apparatus 2 determines whether or not the deliverer 201 has been specified by the processing of S15. When the deliverer 201 has been specified, the process proceeds to S18, and when the deliverer 201 has been specified, the process proceeds to S17. In S17, the information processing apparatus 2 transmits a notification indicating that the delivery request has not been accepted to the communication terminal 3 that has transmitted the delivery request RQ. The communication terminal 3 receives this (S4), and the delivery requester 101 can recognize that.

In S18, the information processing apparatus 2 calculates the scheduled delivery time from the delivery location of the battery 6, the position of the storage location 300 of the battery 6 selected in S12, and the current position of the deliverer 201 specified in S15. The scheduled delivery time may be an approximate value or a more accurate time. The calculation may be, for example, a calculation value obtained by multiplying the total distance of the distance from the current position of the deliverer 201 to the storage location 300 and the distance from the storage location 300 to the delivery location by a coefficient. The distance may be a linear distance, or may be a more accurate distance in consideration of a path between points. In addition, the coefficient may be changed in accordance with the transportation method of the deliverer 201 (FIG. 4B). For example, in the case of walking, the coefficient may be set so that a longer time than in the case of a motorcycle is calculated. When there is a plurality of storage locations 300 of the battery 6 selected in S12, the storage location 300 closest to the current position of the deliverer 201 may be used as a reference, or the deliverer 201 may be required to be notified of the storage location 300 where the battery 6 is to be picked up.

Figure 10B:
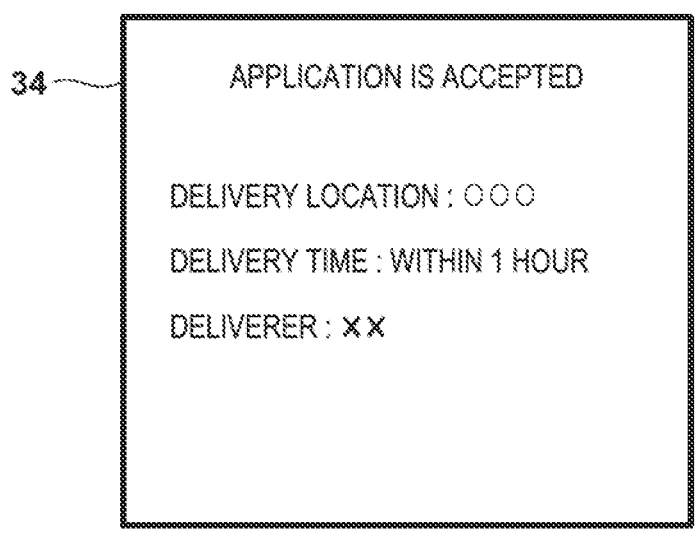
FIG. 10B illustrates a display example of a communication terminal of a deliverer.

In S19, the information processing apparatus confirms establishment of the delivery request, and transmits establishment information indicating the establishment to each of the communication terminal 3 of the delivery requester 101 and the communication terminal 4 of the deliverer 201. The communication terminal 3 receives this (S5), and the delivery requester 101 can recognize that the battery 6 is delivered. FIG. 10B illustrates an example of the establishment information displayed on the display unit 34 of the communication terminal 3. In the illustrated example, information for confirming the delivery location and the delivery time is displayed together with the acceptance of the delivery request. The delivery time is the scheduled delivery time calculated in S18. In addition, identification information (for example, a name and a contact address) of the deliverer 201 is also displayed. Identification can be performed when the battery 6 is delivered. The identification information may be identified by assigning an ID to the vehicle or the battery.

Figure 10C:
FIG. 10C illustrates a display example of a communication terminal of a deliverer.

FIG. 10C illustrates an example of the establishment information displayed on the display unit 44 of the communication terminal 4. In the illustrated example, information for confirming the delivery location, the delivery time, and the storage location is displayed together with the fact of being selected as the deliverer. The delivery time is the scheduled delivery time calculated in S18, and is an estimated time for the deliverer 201 to deliver the battery 6. In addition, identification information (for example, a name and a contact address) of the recipient (delivery requester 101) is also displayed. Identification can be performed when the battery 6 is delivered. The identification information may be identified by assigning an ID to the vehicle or the battery.

Through the above processing, the delivery of the battery 6 by the deliverer 201 is started. As described in FIG. 2B, the deliverer 201 will first receive the charged battery 6 towards the storage location 300 and head to the delivery location. On the other hand, the delivery requester 101 may be concerned about the delivery situation. FIG. 11 illustrates an example of processing related to the confirmation of the delivery situation after the delivery request confirmation.

In S31, the information processing apparatus 2 transmits an inquiry about the current position to the communication terminal 4 of the deliverer 201, and the communication terminal 4 transmits current position information detected by the GPS sensor 45 to the information processing apparatus 2 (S41). In S32, the information processing apparatus 2 updates the information of the "current position" in the deliverer DB 222 regarding the deliverer 201 according to the received current position information. In S33, the information processing apparatus 2 calculates the distance between the current position of the deliverer 201 and the delivery location from the received current position information. In S34, the information processing apparatus 2 determines whether or not the remaining distance calculated in S33 is less than a predetermined threshold value and determines whether or not the deliverer 201 is near the delivery location. The threshold value is, for example, several hundred mm. In a case where it is determined that the deliverer 201 is near the delivery location, the process proceeds to S35, and otherwise, the process proceeds to S36. In S36, the processing of S31 and subsequent steps is performed again after a predetermined time (for example, after 5 minutes).

In S35, the information processing apparatus 2 transmits information indicating that the battery will arrive soon to the communication terminal 3 of the delivery requester 201. The communication terminal 3 receives this information (S51), and the delivery requester 101 can recognize that. The delivery requester 101 can prepare for receiving the battery 6. Note that the information processing apparatus 2 may transmit the current position information of the deliverer 201 to the communication terminal 3 in response to a request from the communication terminal 3 of the delivery requester 201. The delivery requester 101 can know the delivery situation of the battery 6 at an arbitrary timing.

With the above processing, it is possible to assist the service of delivering the battery 6 to the place where the user 101 goes.

Second Embodiment

The delivery candidate 201 may perform other delivery services in addition to the above delivery service. It is efficient if the delivery candidate 201 to whom the delivery inquiry (S154) is to be transmitted can be selected according to the busyness situation of the delivery candidate 201. Therefore, the delivery candidate 201 may be able to provide its own availability (degree of busyness) from the communication terminal 4 to the information processing apparatus 2. FIG. 12A is a flowchart illustrating a processing example between the communication terminal 4 and the information processing apparatus 2 for this purpose.

The delivery candidate 201 operates its own communication terminal 4 to transmit information indicating availability to the information processing apparatus 2 (S61). The information processing apparatus 2 receives this information in S71, and updates the deliverer DB 222 regarding the delivery candidate 201 in S72. FIG. 12B illustrates an example of information accumulated in the deliverer DB 222 according to the present embodiment.

A difference from the example of FIG. 4B is "availability" information. "○" indicates being free (not busy), "Δ" indicates being ordinary, and "x" indicates being busy. The default is "Δ", which may be updated to "○" or "x" by the transmission of the availability from the delivery candidate 201 (S61).

In the search in S151 of FIG. 6, it is possible to refer to the "availability" information and preferentially select a delivery candidate 201 indicating "○".

Third Embodiment

The delivery candidate 201 may perform other delivery services in addition to the above delivery service. Therefore, in addition to the battery 6, other articles may be simultaneously delivered. The other articles may be an article associated with the electrical appliances (102a to 102c) using the battery 6, or may be a product not associated therewith. The other articles may be, for example, foodstuffs such as meat, fish, or vegetables when the electrical appliance is an electric cooking appliance. In addition, the other articles may be, for example, a lighting fixture that can use the battery 6. The types of the other articles may be determined in advance, or may be any type requested by the delivery requester 101.

Figure 13A:
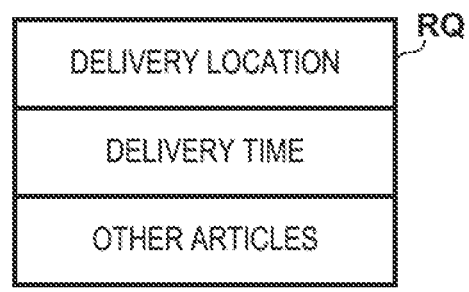
FIG. 13A is a diagram illustrating another example of information included in a delivery request.
Figure 13B:
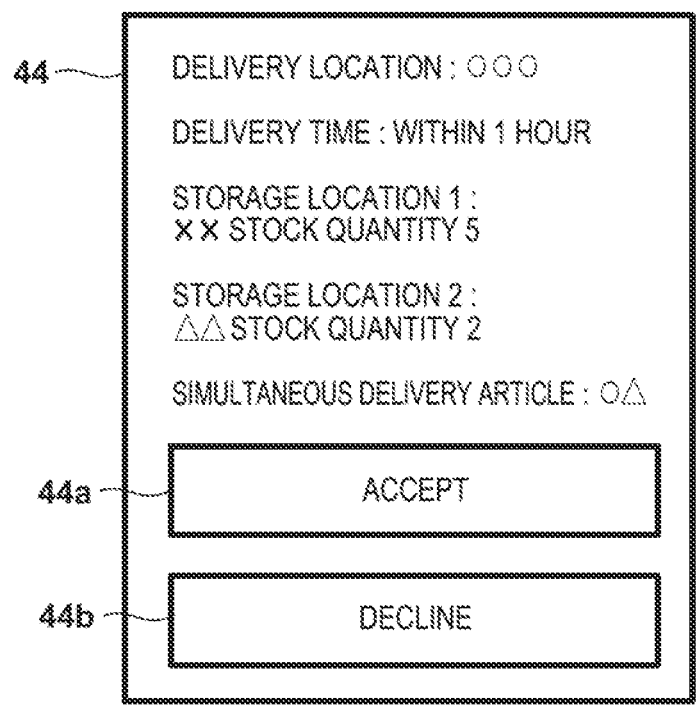
FIG. 13B is a diagram illustrating a display example of a communication terminal of a deliverer.

The other articles can be designated by the delivery requester 101 by inputting into the communication terminal 3, and the delivery request RQ includes "other article" information designated by the delivery requester 101 in addition to the delivery location and the delivery time of the battery 6 as illustrated in FIG. 13A. FIG. 13B illustrates an example of the content of the delivery inquiry transmitted by the information processing apparatus 2 to the communication terminal 4 of the delivery candidate 201 in S154 of FIG. 6 (display example of the display unit 44). In this example, "simultaneous delivery article" information is displayed. "Simultaneous delivery article" is the "other articles" designated in the delivery request RQ. The delivery candidate 201 may determine whether the delivery candidate can procure or transport the "simultaneous delivery article" and then select to accept or decline.

When the delivery request is established, the deliverer 201 acquires the battery 6 and the "simultaneous delivery article" at the storage location 300 and the storage location of the "simultaneous delivery article", respectively, and heads to the delivery location. Since articles other than the battery 6 can be obtained by the delivery requester 101, use of the delivery service can be promoted. Note that the storage location of the battery and the storage location of the simultaneous delivery article may be the same location or different locations.

Fourth Embodiment

In the above embodiment, the delivery request is transmitted from the communication terminal 3 through the operation of the delivery requester 101. However, in the case of an in-vehicle terminal 3c, the in-vehicle terminal 3c may determine the necessity of replacement of the battery 6 on the basis of the degree of consumption of the battery 6 of the electric vehicle 102c, and automatically transmit the delivery request to the information processing apparatus 2 on the basis of the determination result. Alternatively, the in-vehicle terminal 3c may prompt the user 101c to replace the battery 6, and transmit the delivery request to the information processing apparatus 2 in a case where the user 101c agrees.

Summary of Embodiment

The above embodiments disclose at least the following information processing apparatus, method, communication terminal, or storage medium.

1. An information processing apparatus (2) according to the above embodiment includes:
 a receiving unit (23, S11) configured to receive, from a terminal (3) of a delivery requester of a battery (6), a delivery request (RQ) for a battery for which a delivery location of the battery is designated; and
 a specifying unit (21, S15) configured to specify a deliverer who delivers the battery from a storage location (300) where a delivery battery is stored to the delivery location, wherein
 the specifying unit is configured to transmit a delivery inquiry including information of the delivery location and the storage location to a terminal (4) of a delivery candidate (S154), and specify the delivery candidate as the deliverer on condition that a response indicating acceptance of delivery with respect to the delivery inquiry is received from the terminal of the delivery candidate (S158).

According to this embodiment, it is possible to provide a technique for assisting a service for delivering a charged battery to the place where the user (delivery requester) goes. The delivery candidate is given information for determining whether or not to undertake delivery, so that the deliverer can be searched efficiently.

2. According to the above embodiment,
 the specifying unit is configured to select a delivery candidate to whom the delivery inquiry is to be transmitted from a database (222) in which information of a delivery candidate is registered,
 the database includes position information of a delivery candidate, and
 the specifying unit is configured to select a delivery candidate to whom the delivery inquiry is to be transmitted based on the storage location and a current position of the delivery candidate (S151, FIG. 9A).

According to this embodiment, a geographically suitable deliverer can be searched efficiently.

3. According to the above embodiment,
 the specifying unit is configured to select a delivery candidate to whom the delivery inquiry is to be transmitted from a database (222) in which information of a delivery candidate is registered,
 the database includes position information of a delivery candidate, and
 the specifying unit configured to select a delivery candidate to whom the delivery inquiry is to be transmitted based on the delivery location, the storage location and a current position of the delivery candidate (S151, FIG. 9B).

According to this embodiment, a geographically suitable deliverer can be searched more efficiently.

4. According to the above embodiment,
 the specifying unit is configured to select a delivery candidate to whom the delivery inquiry is to be transmitted from a database (222) in which information of a delivery candidate is registered (S151),
 the database includes information indicating availability of each delivery candidate (FIG. 13B), and
 the specifying unit is configured to select a delivery candidate to whom the delivery inquiry is to be transmitted based on the information indicating availability (S151).

According to this embodiment, it is possible to efficiently search for a deliverer who can immediately deal with delivery.

5. The information processing apparatus (2) according to the above embodiment includes:
 a transmitting unit (23, S19) configured to transmit information indicating that the delivery request is established to the terminal of the delivery requester and the terminal of the deliverer specified by the specifying unit when the specifying unit specifies the deliverer.

According to this embodiment, both the delivery requester and the deliverer can be notified of the confirmation of the delivery request.

6. According to the above embodiment,
 a condition regarding delivery time is designated in the delivery request, and
 a condition regarding the delivery time is designated in the delivery inquiry (FIG. 10A).

According to this embodiment, it is possible to meet a temporal demand of the delivery requester.

7. According to the above embodiment,
 the delivery inquiry includes information indicating a stock status of batteries in the storage location (FIG. 10A).

According to this embodiment, the delivery candidate can be provided with useful information for determining whether to undertake the delivery.

8. The information processing apparatus (2) according to the above embodiment includes:
 a calculating unit (21, S18) configured to calculate scheduled delivery time based on at least the delivery location and a current position of the deliverer in a case where the specifying unit specifies the deliverer; and
 a transmitting unit (23, S19) configured to transmit information indicating the scheduled delivery time calculated by the calculating unit to the terminal of the delivery requester.

According to this embodiment, it is possible to provide useful information to the delivery requester.

9. The information processing apparatus (2) according to the above embodiment includes:
 a transmitting unit (23, S35) configured to transmit information indicating that a battery will be delivered soon to the terminal of the delivery requester when a current position of the deliverer during delivery approaches the delivery location.

According to this embodiment, it is possible to provide useful information to the delivery requester.

10. According to the above embodiment,
 the delivery request includes information regarding another article that the delivery requester requests to deliver together with the battery (FIG. 13A), and
 the delivery inquiry includes information regarding the another article (FIG. 13B).

According to this embodiment, articles other than the battery can also be provided to the delivery requester.

11. The information processing apparatus (2) according to the above embodiment includes:
 a selecting unit (21, S12) configured to select a storage location of a battery to be delivered to the delivery requester based on the delivery location from a database in which information of the storage location of the battery is registered,
 wherein the information of the storage location included in the delivery inquiry is information of the storage location selected by the selecting unit.

According to this embodiment, a geographically suitable storage location can be selected.

12. A method according to the above embodiment includes:
 a receiving step (S11) of receiving, by an information processing apparatus (2), from a terminal (3) of a delivery requester of a battery (6), a delivery request for a battery for which a delivery location is designated; and a specifying step (S15) of specifying, by the information processing apparatus (2), a deliverer who delivers the battery from a storage location (300) where a delivery battery is stored to the delivery location, wherein in the specifying step, a delivery inquiry including information of the delivery location and the storage location is transmitted to a terminal (4) of a delivery candidate (S154), and the delivery candidate is specified as the deliverer on condition that a response indicating acceptance of delivery with respect to the delivery inquiry is received from the terminal of the delivery candidate (S158).

According to this embodiment, it is possible to provide a technique for assisting a service for delivering a charged battery to the place where the user (delivery requester) goes. The delivery candidate is given information for determining whether or not to undertake delivery, so that the deliverer can be searched efficiently.

13. A communication terminal (4) according to the above embodiment includes:

a receiving unit (43, S211) configured to receive, from an information processing apparatus (2), a delivery inquiry in which a delivery location of a battery and a storage location of the battery are designated; and a transmitting unit (43, S212) configured to transmit, to the information processing apparatus, a response indicating acceptance of delivery with respect to the delivery inquiry by selection of a user (201).

According to this embodiment, it is possible to efficiently notify a delivery candidate that there is a request for delivery of a battery, and it is possible to provide a technique for assisting a service for delivering a charged battery to the place where the user (delivery requester) goes.

14. A storage medium storing a program according to the above embodiment causes a communication terminal (4) to function as:

a receiving unit (43, S211) configured to receive, from an information processing apparatus (2), a delivery inquiry in which a delivery location of a battery and a storage location of the battery are designated; and a transmitting unit (43, S212) configured to transmit, to the information processing apparatus, a response indicating acceptance of delivery with respect to the delivery inquiry by selection of a user.

According to this embodiment, it is possible to efficiently notify a delivery candidate that there is a request for delivery of a battery, and it is possible to provide a technique for assisting a service for delivering a charged battery to the place where the user (delivery requester) goes.

15. A communication terminal (3) according to the above embodiment includes:

a current position detecting unit (35);

an accepting unit (31, 34, S1) configured to accept designation of a delivery location of a battery;

a transmitting unit (33, S2) configured to transmit, to an information processing apparatus (2), a delivery request of a battery for which the delivery location accepted by the accepting unit is designated; and a receiving unit (33, S3-S5) configured to receive a response with respect to the delivery request from the information processing apparatus, wherein the accepting unit can accept a current position detected by the current position detecting unit or a position different from the current position as the delivery location (FIG. 7A).

According to this embodiment, it is possible to provide a technique that can facilitate designation of the delivery location of the battery by the delivery requester and assists a service for delivering a charged battery to the place where the user (delivery requester) goes.

16. A storage medium according to the above embodiment is a storage medium storing a program for causing a communication terminal (3) with a current position detecting unit (35) to function as:

an accepting unit (31, 34, S1) configured to accept designation of a delivery location of a battery;

a transmitting unit (33, S2) configured to transmit, to an information processing apparatus, a delivery request of a battery for which the delivery location accepted by the accepting unit is designated; and a receiving unit (33, S3-S5) configured to receive a response with respect to the delivery request from the information processing apparatus, wherein the accepting unit can accept a current position detected by the current position detecting unit or a position different from the current position as the delivery location (FIG. 7A).

According to this embodiment, it is possible to provide a technique that can facilitate designation of the delivery location of the battery by the delivery requester and assists a service for delivering a charged battery to the place where the user (delivery requester) goes.

The embodiments of the invention have been described above, the invention is not limited to the foregoing embodiments, and various variations/changes are possible within the spirit of the invention.

What is claimed is:

1. An information processing apparatus comprising: a storage device; and a processor configured, by executing a program, to perform: automatically receiving, from a terminal of a delivery requester of a battery, a delivery request for a battery for which a delivery location of the battery is designated; automatically selecting, for each delivery, at least one storage location of a battery delivered to the delivery requester based on the delivery location; and automatically specifying a deliverer who delivers the battery from a storage location where a delivery battery is stored to the delivery location, wherein in the specifying a delivery inquiry including information of the delivery location and the storage location is transmitted to a terminal of a delivery candidate, and the delivery candidate is automatically specified as the deliverer on condition that a response indicating acceptance of delivery with respect to the delivery inquiry is received from the terminal of the delivery candidate, and when a plurality of storage locations for one delivery is selected in the selecting, the delivery inquiry includes information of each storage location so as to be displayed on the terminal of the delivery candidate, the plurality of storage locations each being different from the delivery location.

2. The information processing apparatus according to claim 1, wherein in the specifying, a delivery candidate to whom the delivery inquiry is to be transmitted is selected from a database in which information of a delivery candidate is registered, the database includes position information of a delivery candidate, and in the specifying, a delivery candidate to whom the delivery inquiry is to be transmitted is selected based on the storage location and a current position of the delivery candidate.

3. The information processing apparatus according to claim 1, wherein in the specifying, a delivery candidate to whom the delivery inquiry is to be transmitted is selected from a database in which information of a delivery candidate is registered, the database includes position information of a delivery candidate, and in the specifying, a delivery candidate to whom the delivery inquiry is to be transmitted is selected based on the delivery location, the storage location and a current position of the delivery candidate.

4. The information processing apparatus according to claim 1, wherein in the specifying, a delivery candidate to whom the delivery inquiry is to be transmitted is selected from a database in which information of a delivery candidate is registered, the database includes information indicating availability of a delivery candidate, and in the specifying, a delivery candidate to whom the delivery inquiry is to be transmitted is selected based on the information indicating availability.

5. The information processing apparatus according to the information processing apparatus according to wherein the processor is configured, by executing the program to perform transmitting information indicating that the delivery request is established to the terminal of the delivery requester and the terminal of the deliverer specified in the specifying when the deliverer is specified in the specifying.

6. The information processing apparatus according to claim 1, wherein a condition regarding delivery time is designated in the delivery request, and a condition regarding the delivery time is designated in the delivery inquiry.

7. The information processing apparatus according to claim 1, wherein the delivery inquiry includes information indicating a stock status of batteries in the storage location.

8. The information processing apparatus according to the information processing apparatus according to wherein the processor is configured, by executing the program to perform calculating scheduled delivery time based on at least the delivery location and a current position of the deliverer in a case where the deliverer is specified in the specifying; and transmitting information indicating the scheduled delivery time calculated in the calculating to the terminal of the delivery requester.

9. The information processing apparatus according to the information processing apparatus according to wherein the processor is configured, by executing the program to perform transmitting information indicating that a battery will be delivered soon to the terminal of the delivery requester when a current position of the deliverer during delivery approaches the delivery location.

10. The information processing apparatus according to claim 1, wherein the delivery request includes information regarding another article that the delivery requester requests to deliver together with the battery, and the delivery inquiry includes information regarding the another article.

11. The information processing apparatus according to claim 1, wherein a processing for reserving the battery of the storage location for the delivery candidate specified in the specifying is performed.

12. The information processing apparatus according to claim 1, wherein in the specifying, the delivery inquiry is transmitted to each terminal of a plurality of delivery candidates, and one delivery candidate is specified as the deliverer in the plurality of delivery candidates.

13. The information processing apparatus according to claim 12, wherein in the specifying, delivery inquiries to terminals of the plurality of delivery candidates are transmitted all together.

14. A method comprising: automatically receiving, by an information processing apparatus, from a terminal of a delivery requester of a battery, a delivery request for a battery for which a delivery location of the battery is designated; automatically selecting for each delivery, by the information processing apparatus, at least one storage location of a battery delivered to the delivery requester based on the delivery location; and automatically specifying, by the information processing apparatus, a deliverer who delivers the battery from a storage location where a delivery battery is stored to the delivery location, wherein in the specifying, a delivery inquiry including information of the delivery location and the storage location is transmitted to a terminal of a delivery candidate, and the delivery candidate is automatically specified as the deliverer on condition that a response indicating acceptance of delivery with respect to the delivery inquiry is received from the terminal of the delivery candidate, and when a plurality of storage locations is selected for one delivery in the selecting, the delivery inquiry includes information of each storage location so as to be displayed on the terminal of the delivery candidate, the plurality of storage locations each being different from the delivery location.

* * * * *

UNITED STATES PATENT AND TRADEMARK OFFICE
CERTIFICATE OF CORRECTION

PATENT NO. : 12,045,759 B2
APPLICATION NO. : 17/485965
DATED : July 23, 2024
INVENTOR(S) : Naoko Nozawa et al.

Page 1 of 1

It is certified that error appears in the above-identified patent and that said Letters Patent is hereby corrected as shown below:

In the Claims

Claim 5, Column 17 Change to:
5. The information processing apparatus according to claim 1,
wherein the processor is configured, by executing the program to perform
transmitting information indicating that the delivery request is established to the terminal of the delivery requester and the terminal of the deliverer specified in the specifying when the deliverer is specified in the specifying.

Claim 8, Column 17 Change to:
8. The information processing apparatus according to claim 1,
wherein the processor is configured, by executing the program to perform
calculating scheduled delivery time based on at least the delivery location and a current position of the deliverer in a case where the deliverer is specified in the specifying; and
transmitting information indicating the scheduled delivery time calculated in the calculating to the terminal of the delivery requester.

Claim 9, Column 17 Change to:
9. The information processing apparatus according to claim 1,
wherein the processor is configured, by executing the program to perform
transmitting information indicating that a battery will be delivered soon to the terminal of the delivery requester when a current position of the deliverer during delivery approaches the delivery location.

Signed and Sealed this
Twenty-sixth Day of August, 2025

Coke Morgan Stewart
*Acting Director of the United States Patent and Trademark Office*